(12) United States Patent
Suzuki

(10) Patent No.: US 6,888,649 B2
(45) Date of Patent: May 3, 2005

(54) PRINTER-BUILT-IN IMAGE-SENSING APPARATUS AND ELECTRIC-CONSUMPTION CONTROL METHOD THEREOF

(75) Inventor: Etsurou Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 10/267,172

(22) Filed: Oct. 9, 2002

(65) Prior Publication Data

US 2003/0043273 A1 Mar. 6, 2003

Related U.S. Application Data

(60) Continuation of application No. 09/118,960, filed on Jul. 17, 1998, now Pat. No. 6,552,821, which is a division of application No. 08/697,492, filed on Aug. 26, 1996, now Pat. No. 5,847,836.

(30) Foreign Application Priority Data

Aug. 29, 1995 (JP) ............................................. 7-242377
Oct. 20, 1995 (JP) ............................................. 7-273000

(51) Int. Cl.$^7$ ........................ G06K 15/00; H04N 1/024; H04N 1/04
(52) U.S. Cl. ........................ 358/1.9; 358/1.3; 358/1.14; 358/472; 358/474
(58) Field of Search ........................ 358/1.9, 1.3, 1.14, 358/406, 468, 1.15, 472, 473, 474, 483

(56) References Cited

U.S. PATENT DOCUMENTS

| 4,262,301 A | * | 4/1981 | Erlichman | ..................... 358/6 |
| 4,819,083 A | * | 4/1989 | Kawai | ........................ 358/294 |
| 4,870,526 A | * | 9/1989 | Maruta | ........................... 361/1 |
| 5,634,730 A | * | 6/1997 | Bobry | .......................... 400/88 |
| 5,636,332 A | * | 6/1997 | Hibino | ....................... 395/112 |
| 5,847,836 A | | 12/1998 | Suzuki | ....................... 358/296 |
| 5,889,597 A | * | 3/1999 | Ara | ............................. 358/473 |

FOREIGN PATENT DOCUMENTS

| JP | 2-101866 | | 4/1990 | ............. H04N/1/04 |
| JP | 04274288 | * | 9/1992 | ............. G09G/5/00 |

\* cited by examiner

Primary Examiner—Jerome Grant, II
(74) Attorney, Agent, or Firm—Morgan & Finnegan, LLP

(57) ABSTRACT

A printer-built-in image-sensing apparatus including a camera which performs image sensing with film exposure, and a printer which prints an image sensed by the camera. After a shutter button has been pressed and image sensing with strobe light emission has been performed, if printing is instructed by pressing of a print button, then electric charging a capacitor of a strobe circuit is made after the completion of the print operation. Otherwise, the charging of the capacitor is started immediately after the image sensing. In this case, even if printing is instructed during the electric charge, printing is started after completion of the electric charge. Thus, electric consumption upon print operation can be reduced and fluctuation of voltage can be suppressed.

7 Claims, 18 Drawing Sheets

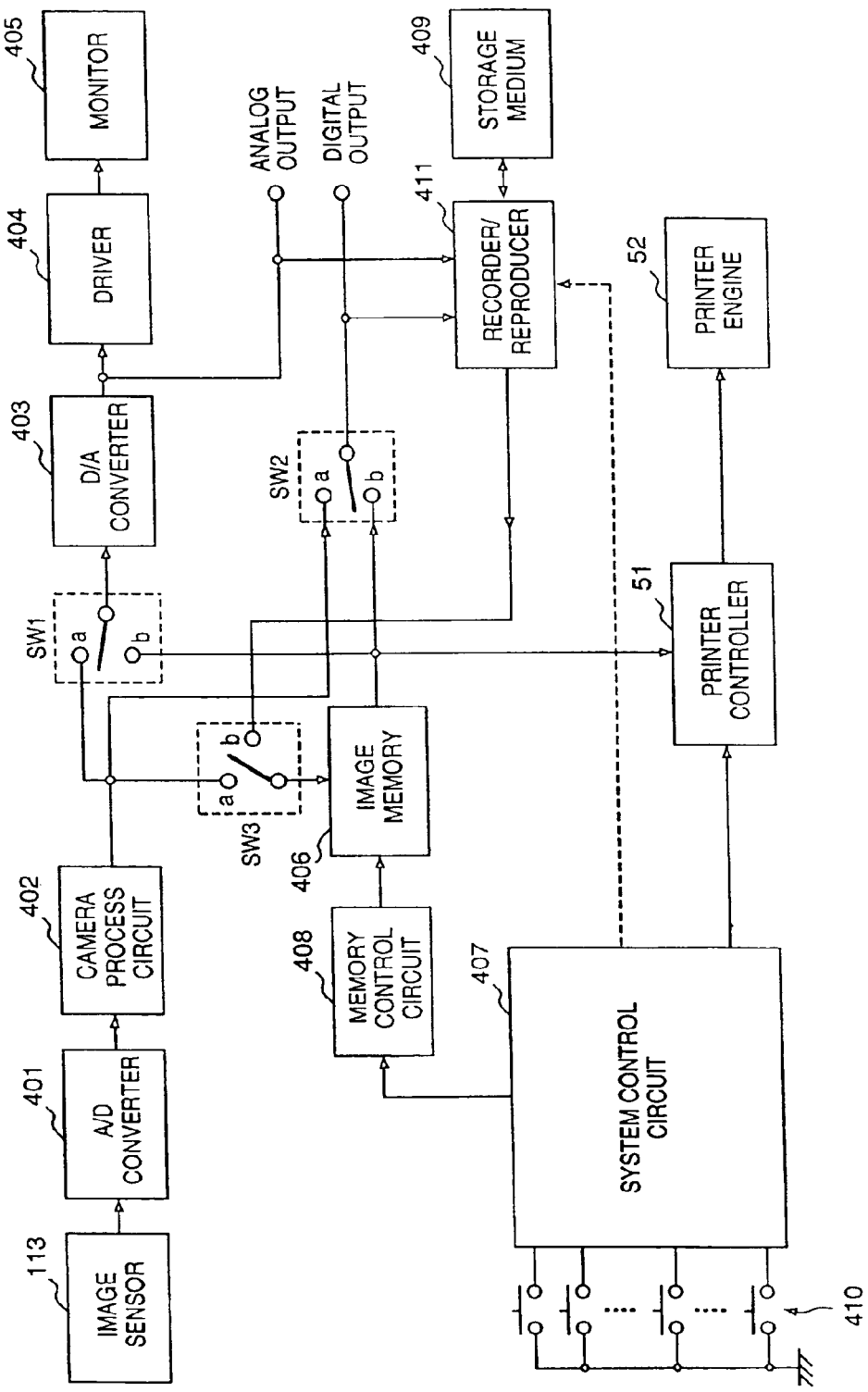

PRINTER-BUILT-IN IMAGE-SENSING APPARATUS AND ELECTRIC-CONSUMPTION CONTROL METHOD THEREOF

This is a continuation of prior application Ser. No. 09/118,960, filed Jul. 17, 1998 now U.S. Pat. No. 6,552,821, which is a divisional of Ser. No. 08/697,492, filed Aug. 26, 1996, issued as U.S. Pat. No. 5,847,836, to which priority under 35 U.S.C. §120 is claimed.

BACKGROUND OF THE INVENTION

1. Field of Invention

This invention relates to a printer-built-in image-sensing apparatus which print-outputs a sensed image on a print medium immediately after image sensing and an electric-consumption control method in the image sensing apparatus.

2. Description of Related Art

Conventionally, to meet needs to obtain a printout of sensed image on the spot, so-called instant cameras which enable such printout, have been proposed in U.S. Pat. Nos. 3,709,122, 3,727,529, 4,000,500, 4,249,811, and 4,212,524 and the like. Further, an instant film and the like used in those instant cameras have been proposed in U.S. Pat. No. 3,707,116.

However, the conventional instant cameras which record sensed images on instant films cannot provide as excellent printouts as still cameras which use silver chloride films in the point of image quality and preservation. Further, when a plurality of printouts are required from the same sensed image, instant cameras cannot perform extra printing. Therefore in such a case, the single printout must be copied, and the obtained copied image(s) is in further degraded image quality.

Further, the conventional instant cameras printout put all the sensed images on the instant films. If undesirable images from failed image sensing or unnecessary images are included in the sensed images, the instant film is wasted. Furthermore, as it is impossible to print only necessary images later, it is inconvenient for users.

To compensate for these drawbacks of instant cameras, a printer-built-in with a printing function has been proposed. This camera stores image information, obtained from image-sensing by a solid-state image sensor such as a CCD sensor, into a memory, at almost the same time as with exposure of a silver chloride film and print-outputs an image at any desired time.

The camera employs a printer such as a melting type thermal-transfer printer, a sublimation type thermal-transfer printer or an ink-jet type printer. Above all, the ink-jet type printer is superior in downsizing, energy-saving, printing speed, running cost and the like, and it is expected as a promising printer for this camera. U.S. Pat. No. 4,074,324 and Japanese Patent Application Laid-Open No. 54-136325 have disclosed this camera with a printing function.

In the printers used in conventional cameras with a printing function, the sublimation-type thermal-transfer printer performs image transfer by vaporizing ink on an ink sheet using the heat of a printhead. In this construction, energy is applied almost at once to all the recording elements (heaters)—of the printhead having a length corresponding to a print width. This requires a very large amount of electricity for printing.

The melting-type thermal-transfer printer performs image transfer by liquefying ink on an ink sheet with the heat of a printhead. In comparison with sublimation-type thermal-transfer printer, electric consumption is smaller. However, as this printer performs printing by repeating print operation of a predetermined width in a print-sheet feeding direction, it takes a long time to print.

The ink-jet printer forms bubbles from liquid ink and discharges ink from nozzles of a print head and uses less electric consumption than that in the above thermal-transfer printers. At this point, the ink-jet printer is promising as a printer for a camera with a printing function.

However, in all of these printers, energy is applied to the print head for printing on a print sheet. Therefore the power source must maintain a stable voltage during printing. on the other hand, if electricity is consumed to execute another function during print operation, the function might not be properly executed due to fluctuation of the voltage of the power source.

The functions that consume much electricity are as follows.

It is known that a strobe light unit applies electric energy to a light-emitting element using a xenon (Xe) tube to emit light and to irradiate an object in a dark environment for image sensing. Generally, the strobe light unit charges a capacitor by using an oscillator or a booster, to 260V or higher from the power source. Otherwise the unit charges a capacitor from about 300V to 360V as a full-charge, from the power source. Then, the capacitor is discharged by a trigger circuit such that the Xe tube emits light within an exposure period of the camera as strobe light emission. As image-sensing operation accompanied by strobe flash/light emission (strobe image sensing) is being completed, the next electric charge is started, and at the completion of electric charge, the next strobe image sensing is ready.

However, if the printer performs print operation during the above electric charge for strobe light emission, the voltage of the power source fluctuates or becomes unstable due to electric consumption for the electric charge. This disturbs proper application of energy to the printhead during print operation, thus causing unprinted dots or density unevenness in a printed image. Further, after strobe image sensing, if print operation is started during charging of the capacitor, electric consumption increases since electricity must be supplied to both the camera and, the printer. Similar to the above case, this may produce poor printouts. If the charging of the capacitor is temporarily stopped, the charging time is prolonged, and the electric charge is not completed until after the print operation has ended. Accordingly the next image sensing cannot be performed immediately.

Cameras having an electronic view finder such as a liquid crystal display (LCD) for determining the composition of an image are known. The electronic view finder displays image information obtained by a solid-state image sensor on an LCD display panel. In this LCD display panel, electric consumption is large since a backlight is employed for a user to see the displayed image easily. The electronic view finder operates even upon feeding a recording medium for recording sensed images. This temporarily increases electric consumption and shortens the life of a battery.

SUMMARY OF THE INVENTION

The present invention has been made in consideration of the above situation, and has its object to provide a printer-built-in image-sensing apparatus which prevents poor printouts by inhibiting electric charge for a strobe light during print operation by a printer, and an electric-consumption saving method in the apparatus.

Another object of the present invention is to provide a printer-built-in image-sensing apparatus which reduces waiting time from the completion of printing to the next image sensing by inhibiting the next print operation until electric charge for a strobe light has been completed, and an electric-consumption saving method in the apparatus.

Another object of the present invention is to provide a printer-built-in image-sensing apparatus which suppresses the increase of electric-consumption at a power battery by stopping display on an electronic view finder during print operation, and an electric-consumption saving method in the apparatus.

Another object of the present invention is to provide a printer-built-in image-sensing apparatus which reduces electric consumption by stopping the power supplied to an electronic view finder during print operation. Further, the present invention has a display unit to display various information on the print operation and an electric-consumption saving method in the apparatus.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is a block diagram showing a construction of a printer-built-in video camera according to a fifth embodiment of the present invention.

DETAILED DESCRIPTION OF THE PREFERRED EMBODIMENTS

Preferred embodiments of the present invention will now be described in detail in accordance with the accompanying drawings.

[First Embodiment]

A first embodiment of the present invention will be described with reference to FIGS. 1 to 5.

Figure 1:
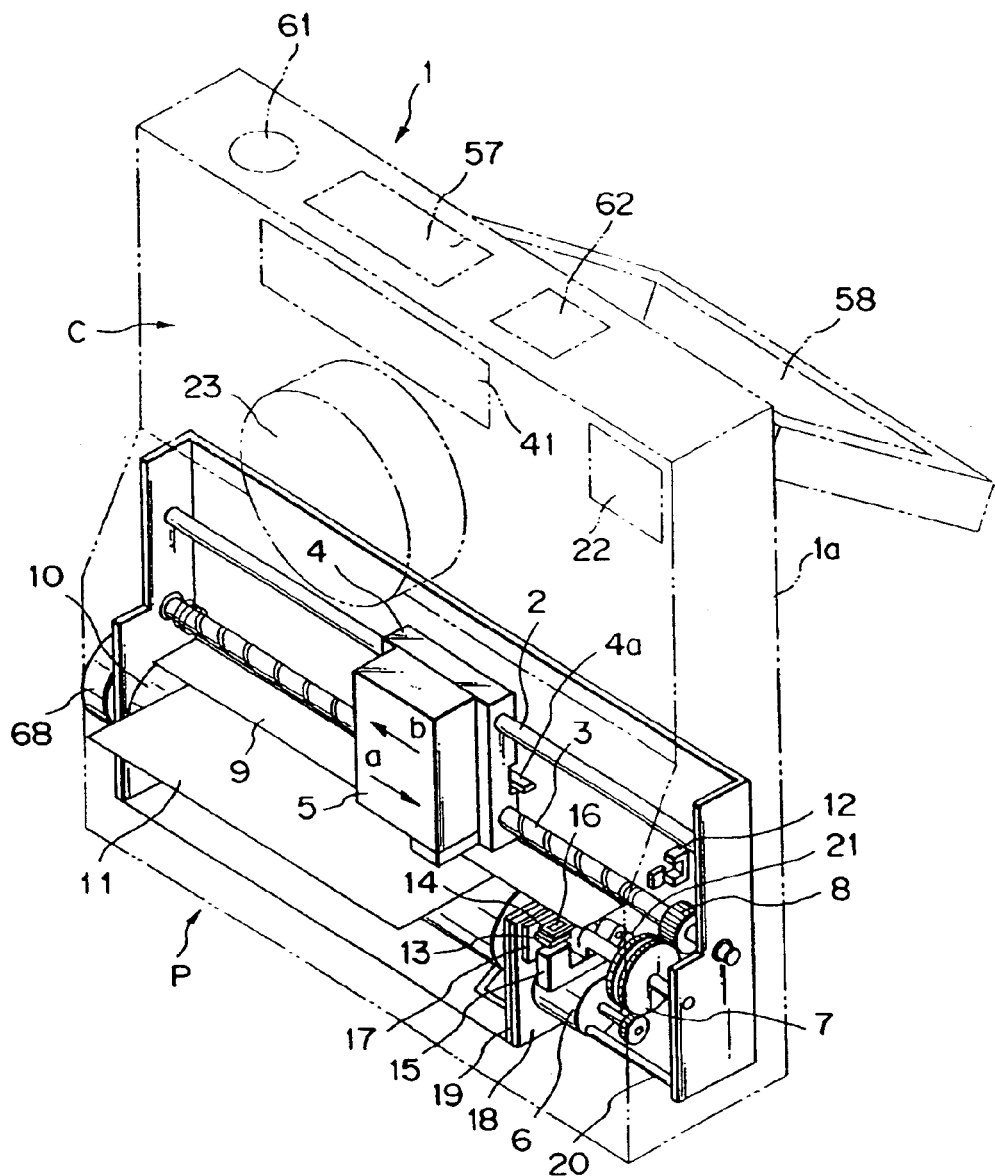
FIG. 1 is a perspective view showing the external view of a printer-built-in image-sensing apparatus (multifunction camera) and a structure of an ink-jet printer, according to a first embodiment of the present invention.
Figure 2:
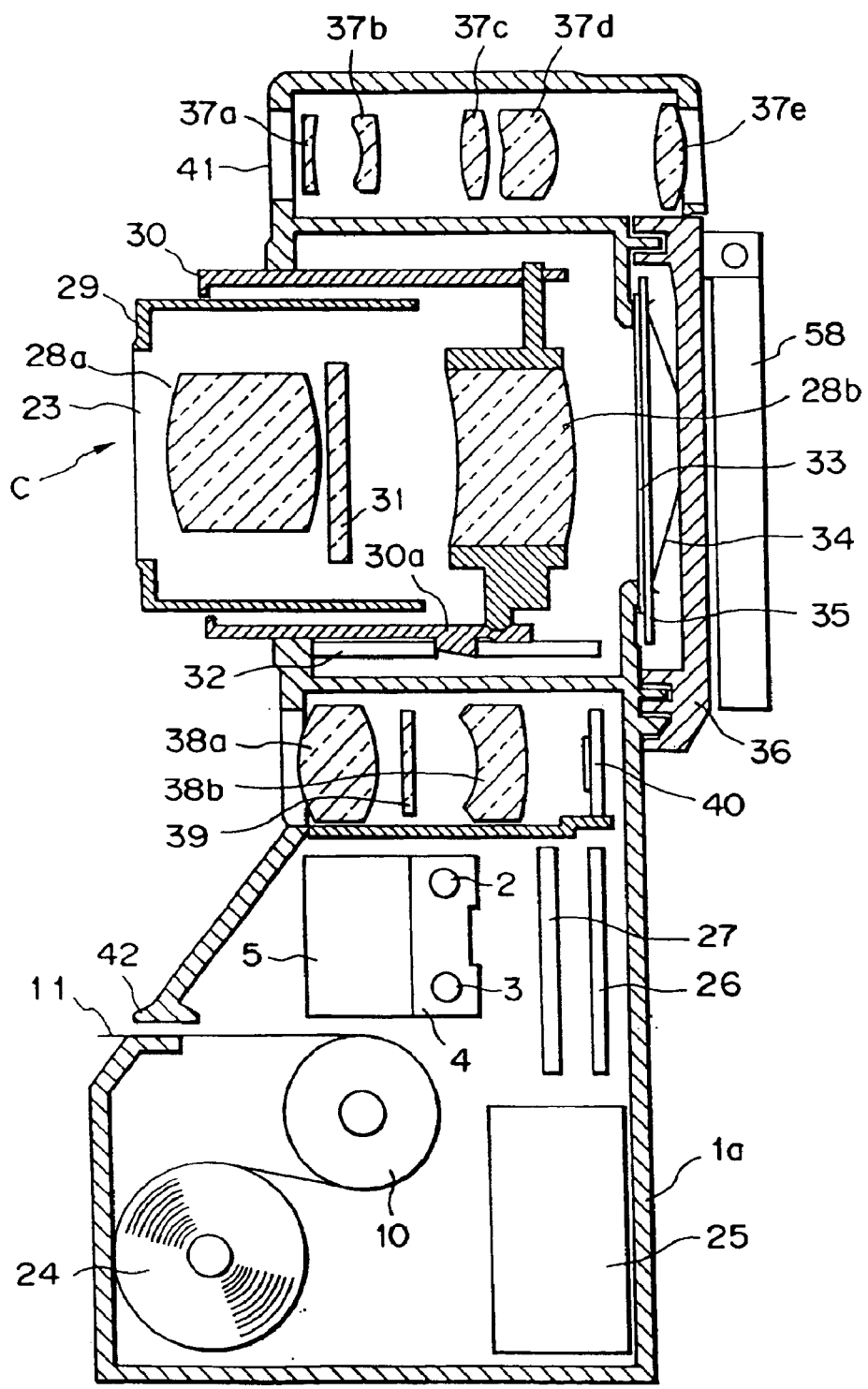
FIG. 2 is a cross-sectional view showing a structure of the multifunction camera according to the first embodiment.
Figure 3:
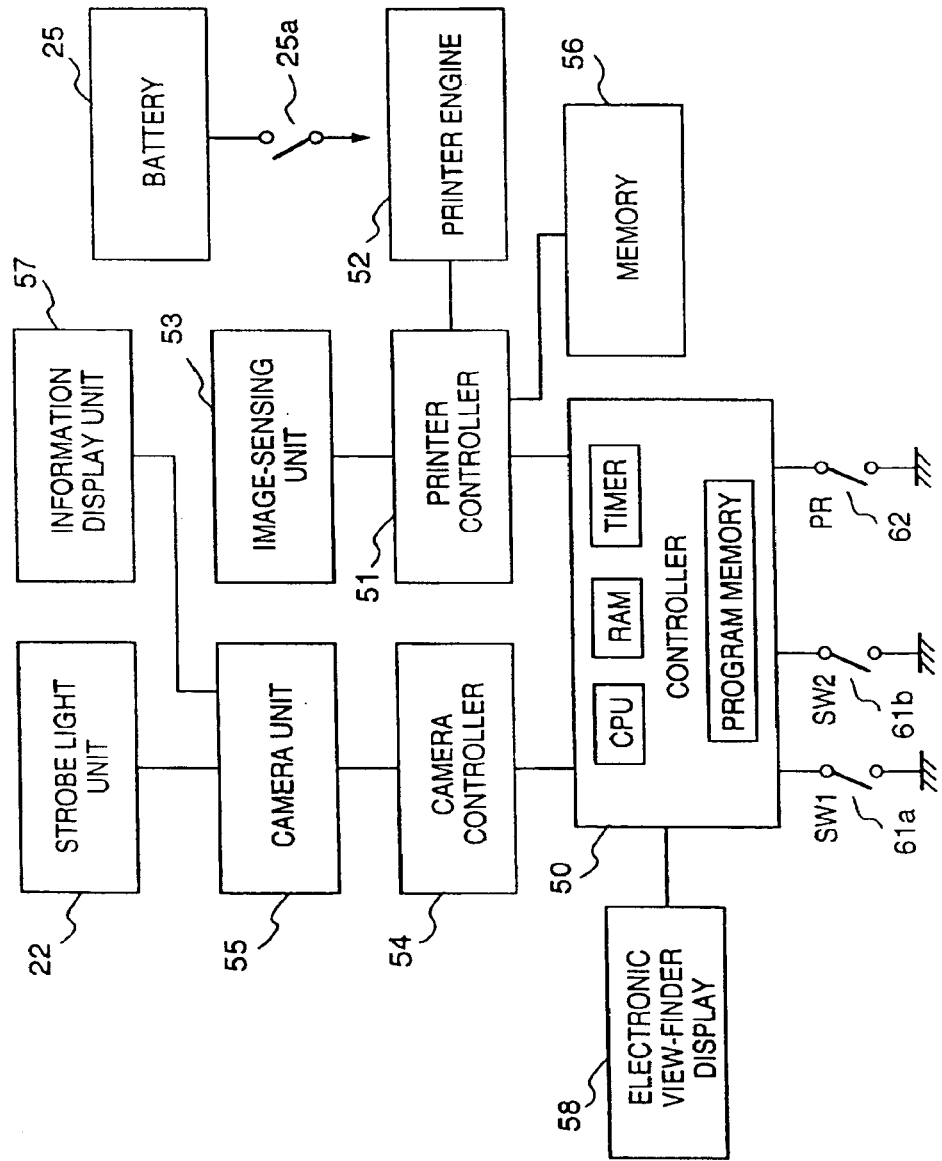
FIG. 3 is a block diagram showing a functional construction of the multifunction camera according to the first embodiment.
Figure 4:
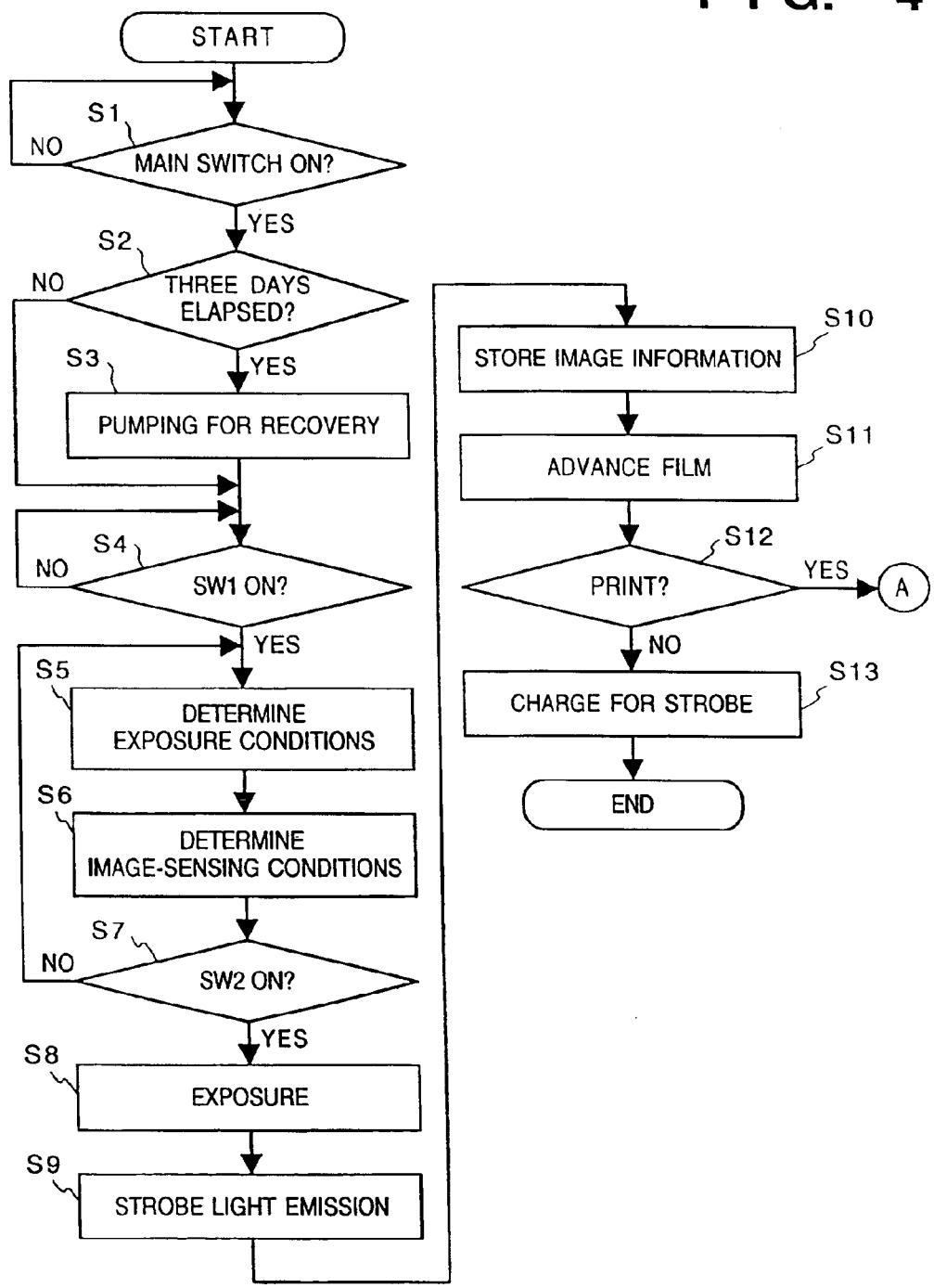
FIGS. 4 and 5 are flow-charts showing processing in the multifunction camera according to the first embodiment.
Figure 5:
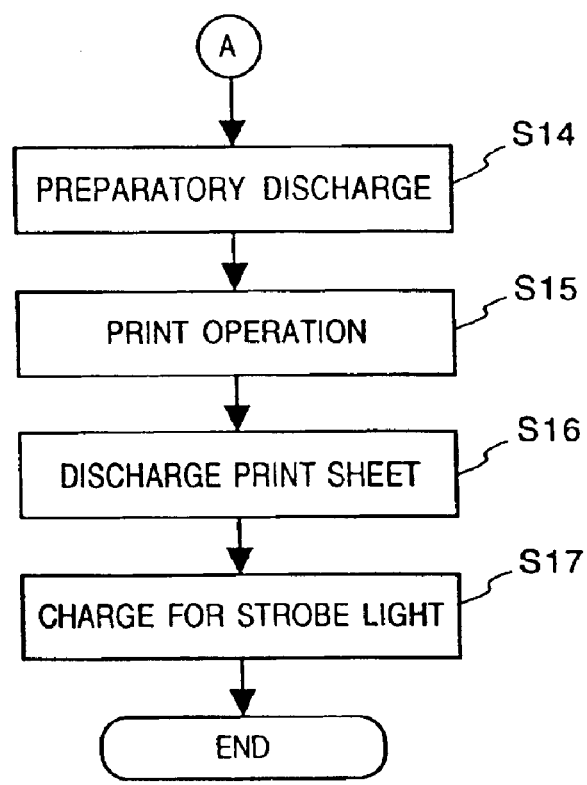

FIG. 1 is a perspective view showing the external view of a printer-built-in camera according to the first embodiment. FIG. 1 especially shows a structure of an ink-jet printer P. FIG. 2 is a cross-sectional view showing a construction of the printer-built-in camera of the present embodiment. FIG. 3 is a block diagram showing a main construction of the printer-built-in camera of the present embodiment. FIGS. 4 and 5 are flow-charts showing processing in the printer-built-in camera of the present embodiment.

The camera of this embodiment is a multifunction camera having a still camera C and a printer P which prints an image sensed by the still camera C. The printer P employs an ink-jet printer, and the still camera C employs a camera using a silver chloride film. However, the present invention is not limited to this arrangement but is applicable to other cameras such as a video camera, to be described later, or a digital camera which stores sensed images into a magnetic disk or the like.

In FIG. 1, reference numeral 61 denotes a shutter button; 62 denotes a print button; 23 denotes an image-sensing window; 22 denotes a strobe light unit; 41 denotes a window for a finder; and P denotes the ink-jet printer. In this figure, the still camera C is a twin-lens reflex camera which takes a picture by pressing the shutter button 61 to expose the silver chloride film set inside. When the print button 62 is pressed, a desired number of images can be printed by an ink-jet printing method. Numeral 57 denotes an information display unit for displaying various information; and 58 denotes an electronic view-finder display.

First, the structure of the printer P will be described with reference to FIG. 1. In FIG. 1, numeral 1a denotes a housing of the printer-built-in camera (multifunction camera) of the present embodiment, in which a guide shaft 2 and a lead screw 3 are provided in parallel at the lower part. An ink-jet head 5 having an ink cartridge is slidably supported between the guide shaft 2 and the lead screw 3 via a carriage 4. The lead screw 3 is engaged with a carriage motor 6 which can move the ink-jet head 5 forward/reverse, via gears 7 and 8. As the lead screw 3 is rotated forward or reverse by the carriage motor 6, the ink-jet head 5 is moved along the guide shaft 2 in the arrows a and b directions.

Below the lead screw 3, a paper-pressing plate 9 and a roll-shaped platen 10 are provided. A print sheet is pressed by the paper-pressing plate against the platen 10, and is fed by turning the platen 10. The carriage 4 has a lever 4a. Sensor 12 having a photocoupler is provided at a home position of the carriage 4 and detects the lever 4a. The arrival of the carriage 4 at the home position is detected by the sensor 12, and the rotational direction of the carriage motor 6 is controlled.

Numeral 13 denotes a support member which supports a cap member 14 for capping the front surface of the ink-jet head 5. Numeral 15 denotes a suction member for sucking within the cap member 14 so as to perform suction recovery of the ink-jet head 5 via an opening 16 of the cap member 14. Numeral 17 denotes a cleaning blade, and numeral 18 denotes a member which moves the cleaning blade 17 upward and downward, and is supported by a support plate 19 of the main body. Numeral 20 dens a lever for starting the suction recovery. It moves along with the movement of a cam 21 engaged with the carriage 4. The movement of the lever 20 can be controlled by changing a drive force from the carriage motor 6 with a well-known switching means such as a clutch.

When the carriage 4 is located within an area of the home position, either capping by the cap member 14, cleaning by the cleaning blade 17, or suction recovery by the suction member 15 can be performed by the operation of the lead screw 3. However, it may be arranged that these operations are controlled at a desired timing.

FIG. 2 is a cross-sectional view showing a structure of is the printer-built-in camera according to the present embodiment.

The still camera C in this multifunction camera comprises a so-called twin-lens reflex camera having a finder for observing an object at an upper part of the printer P, besides an image-sensing optical system, and a second image-sensing optical system having a solid-state image sensor for print-image formation, between the still camera C and the printer P.

In FIG. 2, the still camera C has a set of slide-engaging type lens barrels 29 and 30 having lens units 28a and 28b of the image-sensing optical system. The lens barrel 29 has a shutter unit 31 which controls image-sensing light flux and an exposure amount. Numeral 32 denotes a helicoid member, engaged with a cam convex portion 30a of the lens barrel 30 for rotating the lens barrel 30. The helicoid member 32 is driven by a helicoid drive motor (not shown) to rotate the lens barrel 30 so as to move the lens barrel 30 rightward and leftward and thus the lens units are focused on the object. Thus, the light flux passed through the lens units 28a and 28b and the shutter unit 31 is image-formed on a film 33.

The film (silver chloride film) 33 is pressed by the press board 35 and biased by a press spring 34 such that the film 33 is held flat, thus maintaining optical positional relation. Numeral 36 denotes a rear cover of the still camera C, opened and closed upon changing the film 33. Numerals 37a to 37e denote lenses of the optical system constituting the finder 41. Among these lenses, lenses 37b, 37c and 37d move along with view angle adjustment (zooming) of the image-sensing optical system, to obtain approximately the same view angle as that obtained by the image-sensing optical system.

Further, [in FIG. 2] numerals 38a and 38b denote lens units of the image-sensing optical system for image formation and for transmitting image information to the printer P. Numeral 39 denotes a stop (lens-opening) unit which is driven to obtain an appropriate exposure amount at a solid-state image sensor (CCD) 40 by feed-back control. These lens units 38a and 38b also move along with the view-angle adjustment (zooming) of the image-sensing optical system of the still camera C so as to obtain approximately the same view angle as that obtained by the image-sensing optical system. Especially, to print an image which corresponds to a sensed image by the still camera C, it is necessary that the zooming of the finder 41 and the view-angle adjustment of the lens units 38a and 38b are interlocked.

An image signal from the solid-state image sensor 40 for image formation in the printer P is processed at a signal-processing board 26. As the signal processing is performed and a control signal for the printer P is generated, the control signal is transferred to a printer-control board 27, at which the control signals necessary for print operation are generated with information such as a position-control signal for the ink-jet head 5. These signals are supplied to the carriage motor 6, the ink-jet head 5 and the like, and printing is performed.

The print operation in the printer P is started when the print button 62 is pressed. As the print operation starts, the print sheet 11 is pulled out from a print-sheet roll 24 via the platen 10, and printed by the ink-jet head 5 Numeral 42 denotes a sheet cutter provided at the housing 1a of the multifunction camera of the present embodiment, used for cutting the printed sheet. Numeral 25 denotes a power battery. The power battery 25 supplies electricity to the printer P and the still camera C.

Next, a construction to control the printer-built-in camera according to the present embodiment will be described with reference to the block diagram of FIG. 3.

In FIG. 3, numeral 50 denotes a controller having a CPU such as a microprocessor, a program memory (ROM) in which programs executed by the CPU are stored, a RAM used as a work area upon control operation by the CPU, and the like. The controller 50 controls the operation of the still camera C and that of the printer P. Numeral 54 denotes a camera controller which controls an exposure period, the level of lens-opening, a focusing position and the like, based on instructions from the still camera C and the controller 50. A camera unit 55 includes an optical lens 28 and the lens barrels 29 and 30 and the like, and the camera unit 55 exposes the silver chloride film 33. The strobe light unit 22 includes a capacitor (222 in FIG. 13) to cause a xenon lamp (225 in FIG. 13) to emit light with shutter operation of the camera unit 55.

Further, the printer controller 51 is connected to a printer engine 52, an image-sensing unit 53 and a memory 56. The printer controller 51 controls the printer P to perform print operation, in accordance with an instruction of a control signal from the controller 50. The image-sensing unit 53 includes the optical lenses 38a and 38b for reading images for printing, the stop unit 39, the CCD 40 which photo-electric-converts an optical signal inputted through these devices, and the like. The printer engine 52 drives the printer P comprising an ink-jet printer to print-output an image signal stored in the memory 56. The image signal obtained from the image-sensing unit 53 is stored in the memory 56 in the form of digital signal. The controller 50 is also connected to the aforementioned shutter button 61 (including switches 61a and 61b) and the print button 62. Note that the switch 61a is turned on when a user lightly presses the shutter button 61, while the switch 61b is turned on when the user further presses the shutter button 61. Numeral 25a denotes a power switch which is used to turn on/off the power supply to the camera main body from the battery 25. Note that in the controller 50, a timer which is measuring time is provided with electricity, regardless of the on/off status of the power switch 25a.

Next, the operation of the multifunction camera according to the first embodiment will be described with reference to the flow-chart of FIGS. 4 and 5. Note-that a control program for execution of this operation is stored in the program memory of the controller 50.

At step S1, when the user turns the power switch 25a on, the process proceeds to step S2, at which point it is determined whether or not it has been three days (72 hours) or longer since the camera was used last time and the power was turned off. The determination is made based on time measurement by the timer that keeps time even when the power of the camera is turned off. At step S2, if it is determined that it has been three days or longer, the process proceeds to step S3, at which point an instruction to perform recovery pumping is outputted to the printer controller 51 which controls the printer P, and the printer engine 52 is driven.

The recovery pumping is performed to ensure printing by the ink-jet printer P. More specifically, the recovery operation is to clean nozzles of the ink-jet head 5 by using a suction pump or the like before execution of printing on a print sheet. In this embodiment, if the printer has not been used for three days or longer, it is determined that the recovery pumping should be performed upon turning the power on.

Next, the process proceeds to step S4, at which point it is determined whether or not the user has pressed the shutter button 61 to a first stroke position, whereby the switch 61a is turned on. If YES, the switch 61a is connected. Then the controller 50 drives the camera unit 55 via the camera controller 54, to determine various conditions necessary for exposure such as an exposure control amount, distance-measurement information, and use/omission of strobe light emission.

Further, at step S6, the controller 50 drives the image-sensing unit 53 via the printer controller 51 to control the stop unit 39 to maintain an appropriate amount of light entering the solid-state image sensor 40 of the image-sensing unit 53. The controller then determines image-sensing conditions to obtain image information for printing.

Next, at step S7, as the user further presses the shutter button 61 to execute actual image sensing and the switch 61b is connected, the process proceeds to step S8, at which point the controller 50 drives the camera unit 55 via the camera controller 54, to perform a series of exposure operations such as moving of the lenses for focusing, shutter-speed control, lens-opening amount control, and, if necessary, strobe light emission (step S9).

The strobe light emission is made by an X contact-point signal generated during lens opening by the shutter under control of the camera controller 54. If a photoreception sensor (not shown) which controls an exposure-control value determines that the exposure is proper, the controller 50 stops light-emitting operation of the strobe light unit 22 (step S9). Then the process proceeds to step S10, at which point the controller 50 drives the image-sensing unit 53 via the printer controller 51 to store image information inputted into the solid-state image sensor 40 in the memory 56. Thereafter, at step S11, when the user releases the shutter button 61, the film 33 is advanced.

At step S12, whether or not the user has pressed the print button 62 is determined. If it is determined that the print button 62 has not been pressed (i.e., a print requirement has not been made), the process proceeds to step S13. At step S13, electric charging of the capacitor 222 (FIG. 13) of the strobe light unit 22 is started via the camera controller 54.

On the other hand, if the user wants to print the obtained image, the user presses the print button 62 (YES at step S12). The process proceeds to step S14, at which point the printer controller 51 moves the ink-jet head 5 to the home position. Then to further ensure printing, the printer controller 51 performs preparatory discharging to remove clogged ink from the ink-jet head 5, and performs recovery processing of, (e.g., supplying) ink to a nozzle where ink has evaporated.

Next, the process proceeds to step S15, at which point the printer controller 51 performs image processing for print-output on the image information stored in the memory 56, and outputs the image information to the printer engine 52 which then performs printing. Note that an error-diffusion method is effective as the image processing performed at this step. As the predetermined print operation has been completed, the process proceeds to step S16, at which point the printed portion of the print sheet 11, printed at the printer engine 52, is fed until it is ejected outside of the camera. Then, the printed portion of the print sheet 11 is cut by the cutter 42. Thus the user can obtain approximately the same image as the sensed image, as a printout, at the same time as film exposure in the camera C.

Thereafter, the process proceeds to step S17, at which point the controller 50 starts electric charge of the capacitor 222 (FIG. 13) of the strobe light unit 22 of the camera unit 55 via the camera controller 54.

This prevents degradation of voltage at the battery 25 due to simultaneous power supply to the printer P and the electric charge. Further, full charging of the capacitor 222 of the strobe light 22 can be performed.

Figure 6A:
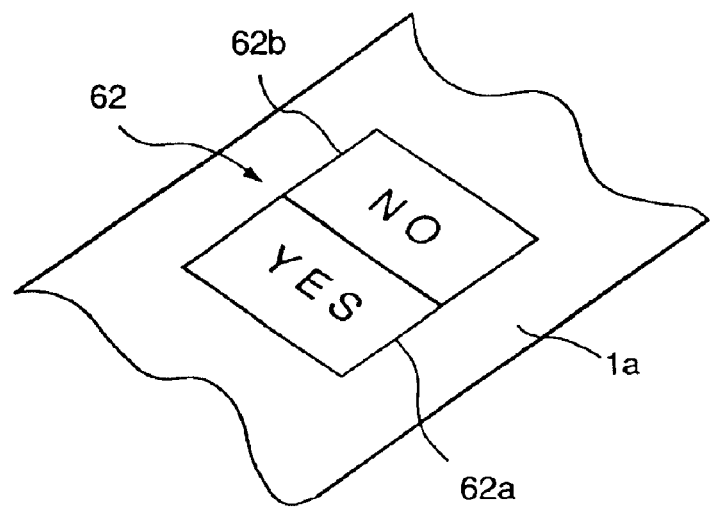
FIG. 6A is a perspective view showing another example of a print button of the first embodiment.
Figure 6B:
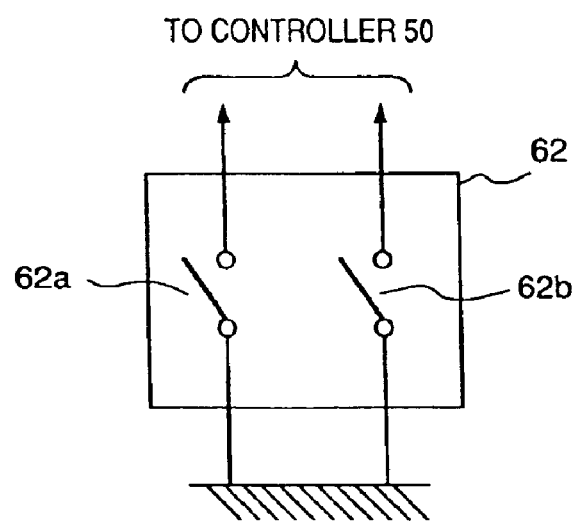
FIG. 6B is a block diagram showing the other example of the print button.

Note that the present embodiment provides only one print button 62 for instructing printing. However, the present invention is not limited to this arrangement. As shown in FIGS. 6A and 6B, for example, the housing 1a of the camera may have a switch [YES] 62a to require printing and a switch [NO] 62b not to require printing. It may be determined at step S12 whether or not printing should be performed, based on which of these buttons has been pressed.

[Second Embodiment]

Next, the printer-built-in camera (multifunction camera) according to a second embodiment will be described with reference to FIGS. 7 to 12.

In the multifunction camera of the second embodiment, the image-sensing device which obtains image information for printing by the printer P is provided on an optical path branched from the image-sensing optical system which forms the image on a silver chloride film. Thus image information can be obtained with approximately the same view angle as that of an image recorded on a silver chloride film.

More specifically, after the image recorded on the silver chloride film has been developed and print processed, an image with approximately the same view angle as that of an image recorded on the silver chloride film can be print-outputted. Thus the multifunction camera can produce a printout closer to a printout from the silver-chloride film.

Next, the print operation by the printer P while a capacitor in the strobe light unit is being charged will be described.

Figure 7:
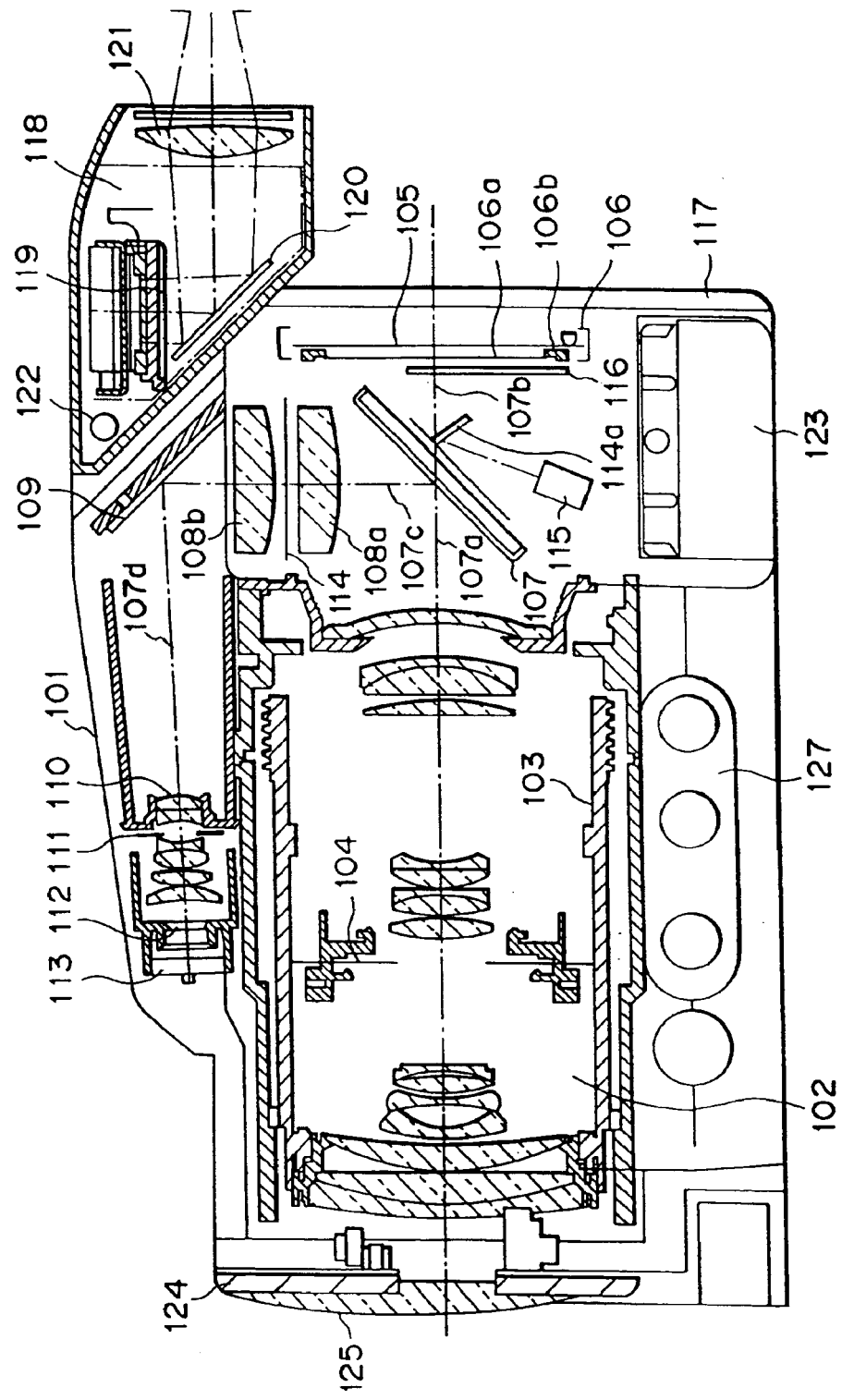
FIG. 7 is a cross-sectional view showing the left half of the multifunction camera according to a second embodiment of the present invention.

FIG. 7 is a cross-sectional view showing the left half of the multifunction camera according to the second embodiment. In FIG. 7, numeral 101 denotes a cover comprising a plurality of parts connected with screws and the like; 102 denotes a lens unit for focusing an image on a silver chloride film 105; 103 denotes a lens barrel for constituting the lens unit 102 and holding lens elements; and 104 denotes an iris-stop unit for still image sensing using the silver chloride film 105. In the second embodiment, the lens unit 102 is a zoom lens comprising zoom-lens elements movable on an optical axis in accordance with automatic or manual zooming operation and focusing lens elements driven based on information from an automatic focus detection unit to be described later.

Numeral 106 denotes a shutter unit comprising a shutter film 106a, a shutter frame 106b and the like, provided in front of the silver chloride film 105; 107 denotes a semi-transparent thin-film mirror for separating an image from an object for the silver chloride 105 side and an image sensor 113 side; 107a denotes an optical axis of light impinged from the object side; 107b denotes an optical axis of light which passes through the semitransparent thin-film mirror 107 and reaches the silver chloride film 105 side; 107c denotes an optical axis reflected by the semitransparent thin-film mirror 107; 107d denotes an optical axis reflected by a reflection mirror 109; 108a and 108b denote field lenses provided on the optical axis 107c, for focusing the object image; 109 denotes the reflection mirror for deflecting the optical axis 107c; 110 denotes a compression lens unit including a video stop unit 111 for video moving-image sensing, provided on the optical axis 107d; 112 denotes an optical low-pass filter; 113 denotes a solid-state image sensor such as a CCD; and 114 denotes a submirror on which the light flux branched by the semitransparent thin-film mirror 107 is image-formed as a temporary image at a position equivalent to an image-forming position on the silver chloride film 105. The temporary image on the submirror 114 is again image-formed on the solid-state image sensor 113 by the expansion lens unit 110.

The submirror 114 is withdrawable to a position 114a at the rear of the semitransparent thin-film mirror 107 upon image sensing. The submirror 114 guides part of image-sensed light to an automatic focus detection unit 115. The automatic focus detection unit 115 of the second embodiment employs a so-called phase-shift detection method which compares a plurality of images from the light fluxes passing through different areas at the image lenses and detects a defocus amount and defocus directions on the film 105. Note that since the solid-state image sensor 113 always obtains the object image, automatic focusing can be performed by blur correction based on a high-frequency video signal from the solid-state image sensor 113. Otherwise, the blur correction may be combined with the phase difference detection of the second embodiment.

Numeral 116 denotes a light-shielding plate which is required to use the semitransparent thin-film mirror 107, for preventing leakage of light. The light-shielding plate 116 is withdrawable upon image sensing. Numeral 117 denotes a rear cover unit which can be freely opened/closed for setting/changing the silver chloride film 105. The second embodiment uses a 135 type silver chloride film as the silver chloride film 105. However, the present invention is not limited to this type of film; drop-in type films or disk type films, for example, can be used as the film 105.

Numeral 118 denotes an electronic view-finder unit which display-outputs the video signal from the solid state image sensor 113 on a compact LCD 119 so that the user can monitor the video image via a reflection mirror and an eyepiece lens 121. The view-finder unit 118 is pivotable with a rotational axis 122.

In this construction, normally, the iris-stop unit 104 for still image sensing using the silver chloride film is always opened, and when a release switch, to be described later, for the still image sensing is pushed, the iris-stop unit 104 is closed to a predetermined diameter. When an image to be outputted to the printer P is stored, the video stop unit 111 of the compression lens unit 110 is also controlled, and appropriate exposure can be obtained by changing the storing period at the image-sensor 113 and the gain of a signal-processing system in accordance with necessity.

Numeral 123 denotes a battery removably attached at a lower part of the multifunction camera. The battery 123 is a common single battery to supply all electric power of the multifunction camera. An openable/closable barrier 125 including a strobe light 124 is provided in front of the lens unit 103. Numeral 127 denotes an external terminal such as an interface between the multifunction camera and an external device such as a television or a stereo set.

Figure 8:
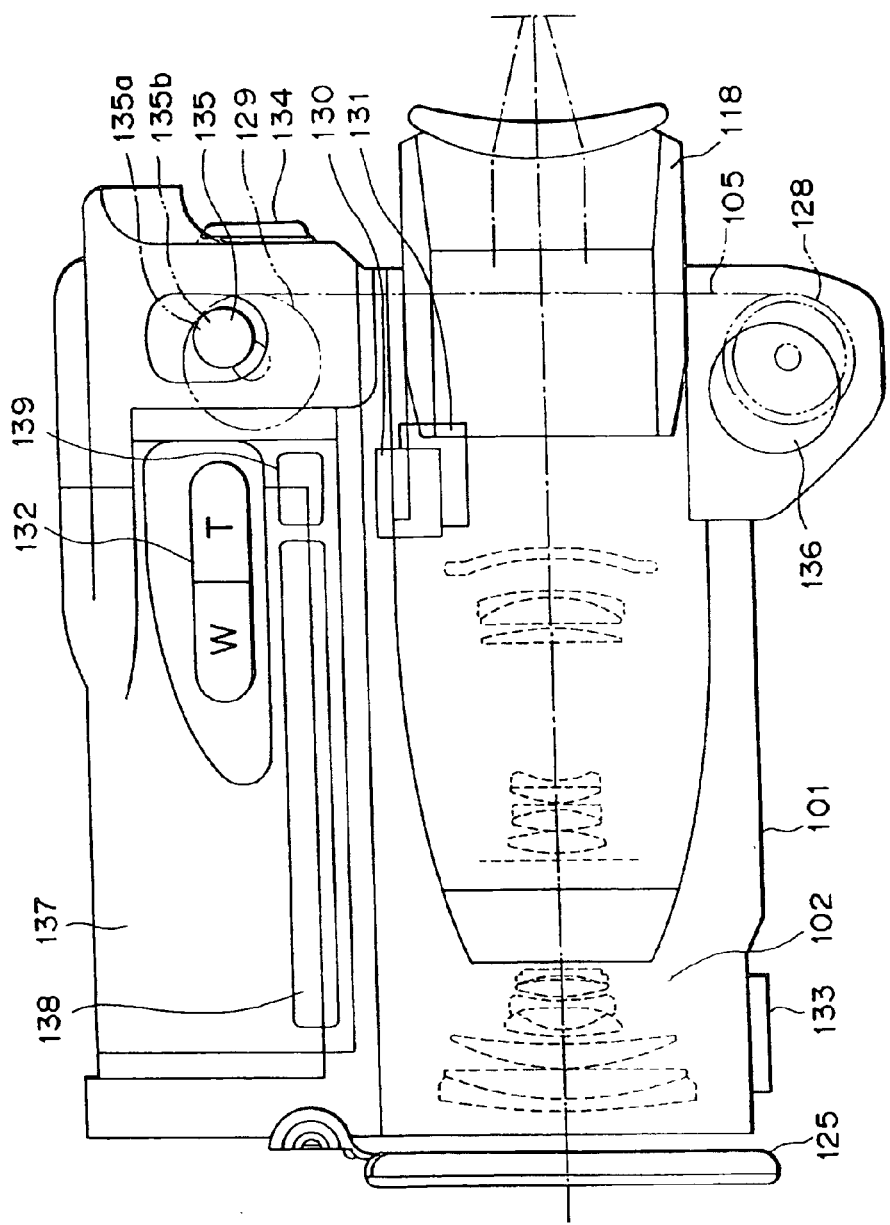
FIG. 8 is a top plan view of the multifunction camera according to the second embodiment.

FIG. 8 is a top plan view of the multifunction camera according to the second embodiment.

In FIG. 8, numeral 128 denotes a cartridge for the silver chloride film 105; and 129 denotes a spool for taking up the film 105. The second embodiment employs a prewind method which initially winds the newly-set film on the spool to the final frame, and upon image sensing, sequentially rewinds exposed frames.

Numeral 130 denotes a zoom drive motor for image-sensing lenses; 131 denotes a focus drive motor; 132 denotes a zoom button provided at a position operable by the user's right hand; 133 denotes a main-mode selection switch which is also used as a power switch; 134 denotes a print button for instructing the start of print-output; and 135 denotes a shutter button for still image sensing which can be used upon image sensing using a silver-chloride film. Similar to the first embodiment, the shutter button 135 has a switch 135a which is turned on when the shutter button 135 is pressed to a first stroke position, and a switch 135b which is turned on when the shutter button 135 is further pressed.

Further, the camera has a mode selection dial 136 at a position opposite to these operation parts. The mode selection dial 136 is used for selecting either a programmed-exposure mode, a portrait mode using a long lens-opening, a sport mode having preference of shutter speed, backlighted-shot mode or the like.

Light measurement is made, in accordance with the above modes, by detecting the level of a luminance signal from the solid-state image sensor 113, and feedback control is performed in accordance with the detected result. The present embodiment divides the image sensor 113 for printer P into a plurality of electrical areas and uses the electrically-divided image sensor 113 as a light measurement device. However, it may specially provide a dedicated light measurement device.

Numeral 137 denotes a printer engine unit provided on the right part of the lens unit 102. The second embodiment uses an ink-jet printer having the same construction as that of the first embodiment. However, the present invention is not limited to this printer.

Further, a control panel 138 for controlling image quality or density upon printing, and a discharge button 139 for instructing discharge of a print sheet are provided on the upper surface of the camera.

Figure 9:
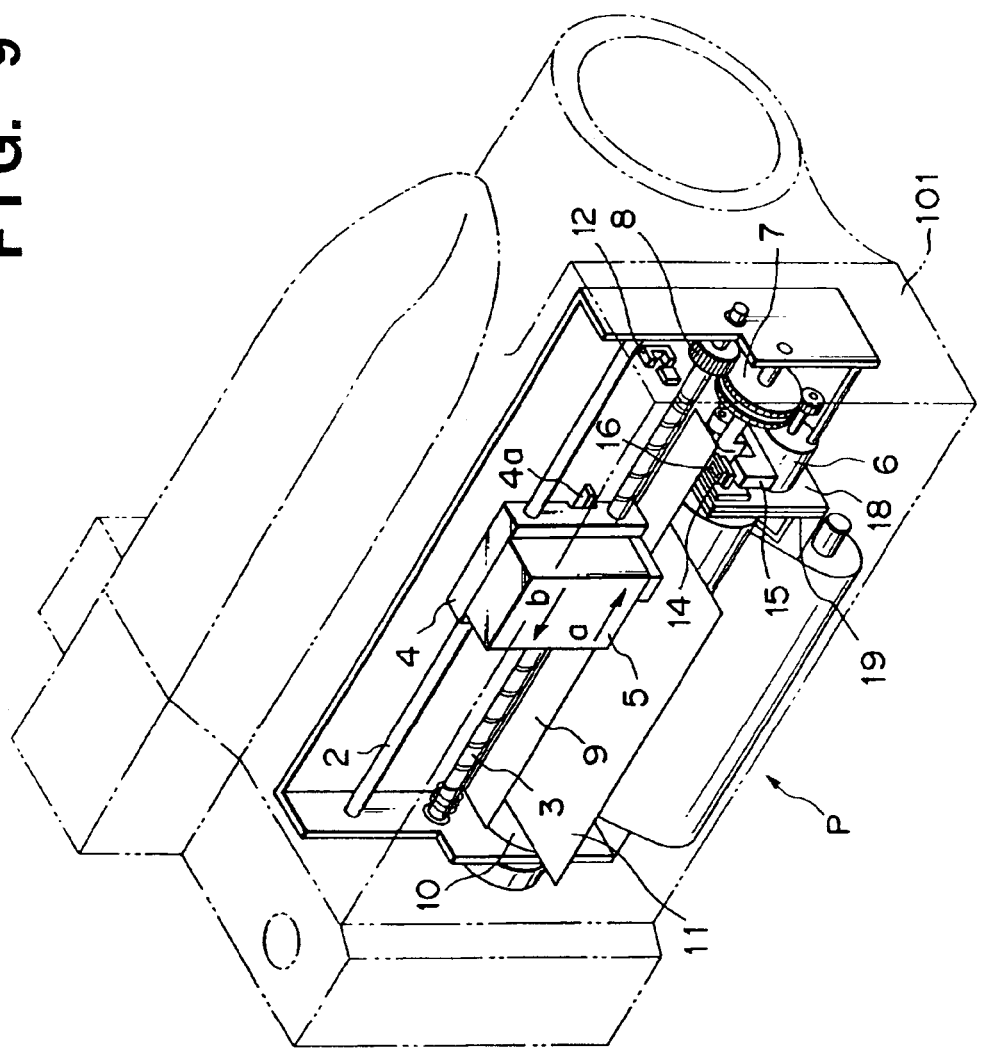
FIG. 9 is a perspective view showing a structure of the multifunction camera according to the second embodiment.

FIG. 9 is a perspective view showing a structure of the multifunction camera according to the second embodiment. In FIG. 9, elements corresponding to those in FIG. 1 have the same reference numerals and the explanation of the elements will be omitted.

Figure 10:
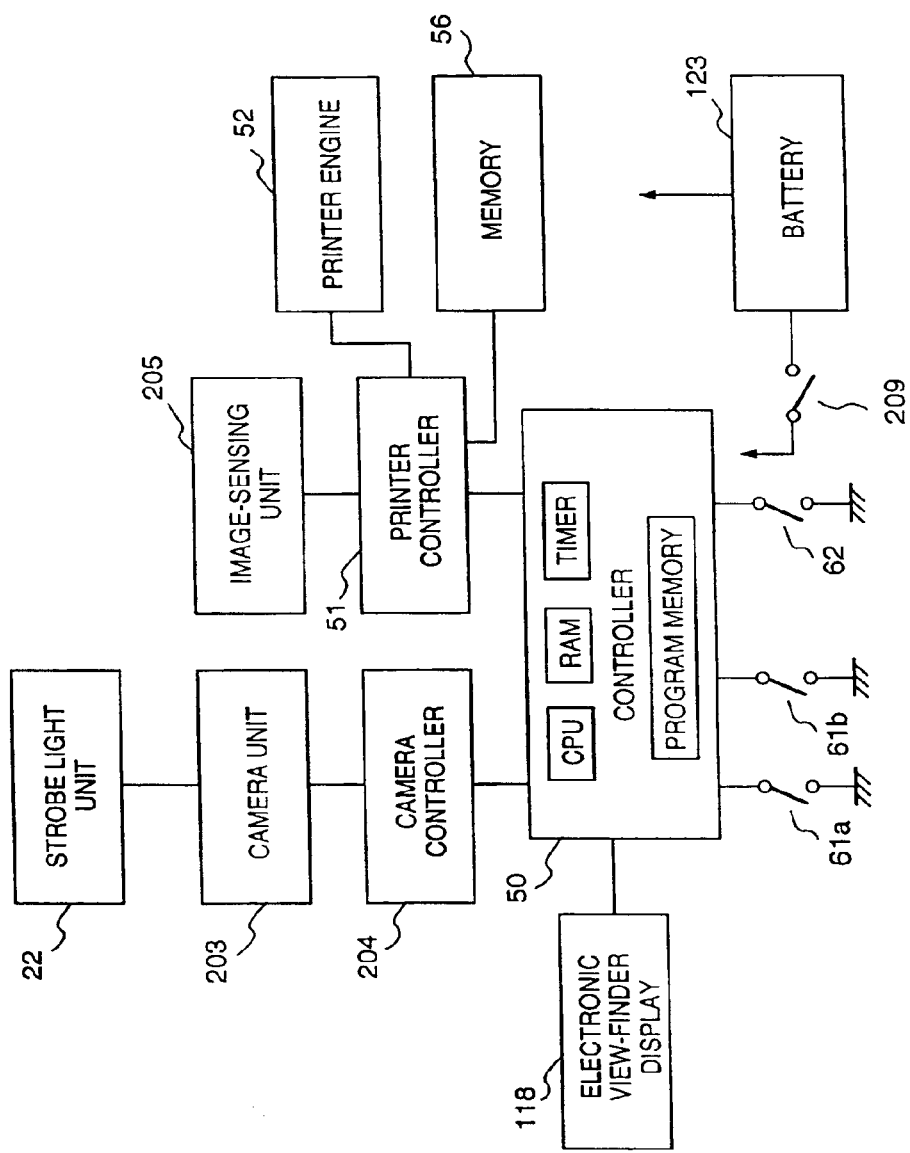
FIG. 10 is a block diagram showing a functional construction of the multifunction camera according to the second embodiment.

FIG. 10 is a functional block diagram of the multifunction camera (printer-built-in camera) according to the second embodiment. The structure of the multifunction camera of this embodiment is basically the same as that of the first embodiment, and elements corresponding to those in the first embodiment have the same reference numerals. Note that different from the camera unit 55, the camera controller 51 and the image-sensing unit 53 of the first embodiment, a camera unit 203, a camera controller 204 and an image-sensing unit 205 have constructions as shown in FIGS. 7 and 8.

Figure 11:
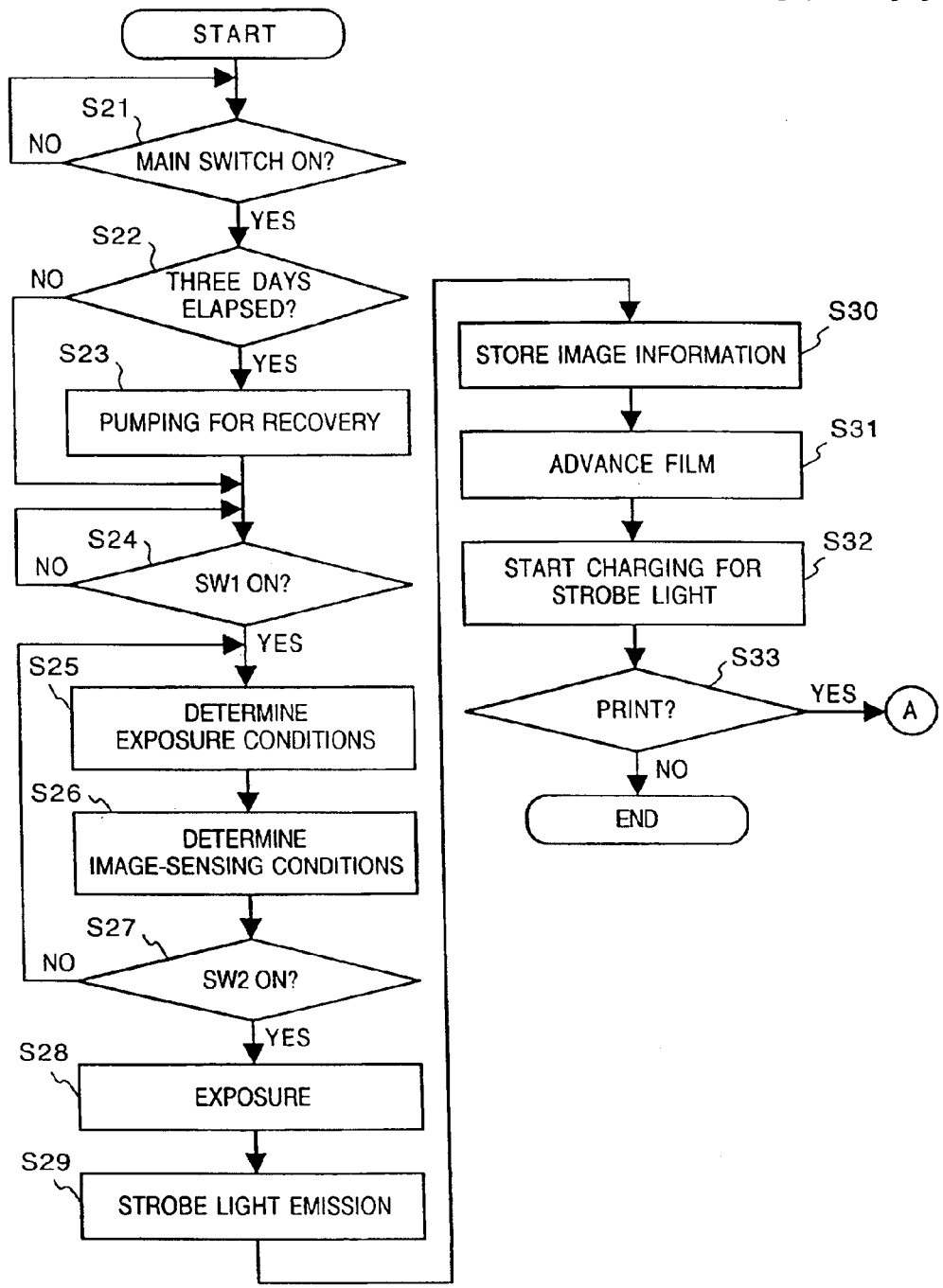
FIGS. 11 and 12 are flow-charts showing processing in the multifunction camera according to the second embodiment.
Figure 12:
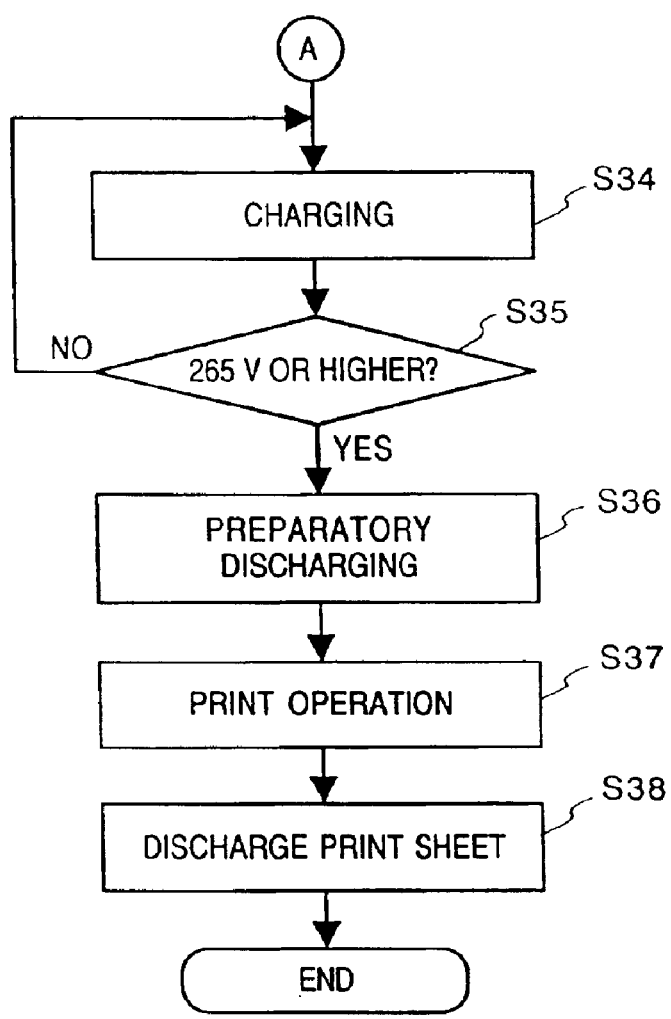

FIGS. 11 and 12 are flowcharts showing the processing steps for taking one picture in the multifunction camera according to the second embodiment. A control program for executing the processing is stored in a program memory of the controller 201.

In the flowchart of FIG. 11, the processing at steps S21 to S31 are the same as that at steps S1 to S11 in the flowchart of FIG. 4. Therefore, the explanation of the processing will be omitted.

In the multifunction camera of the second embodiment, when feeding of the film has been completed and the operation of a film-wind drive motor (not shown) is stopped (S31), charging of the capacitor for strobe light is started at step S32. At step S33, it is determined whether or not printing of the image obtained at step S30 has been instructed. If printing has been instructed, the process proceeds to step S34, at which point charging of the capacitor is continued. At step S35, whether or not the charged voltage is a predetermined level, (e.g., "265 V" or higher) is determined. When the charged voltage becomes the predetermined level, the process proceeds to step S36. Similar to steps S14 to S17, preparatory discharging is performed at step S36, print operation is performed at step S37, and a printed sheet is discharged at step S38.

As the second embodiment charges the capacitor of the strobe light before printing, preparation for the next image sensing can be quickly made after printing.

Figure 13:
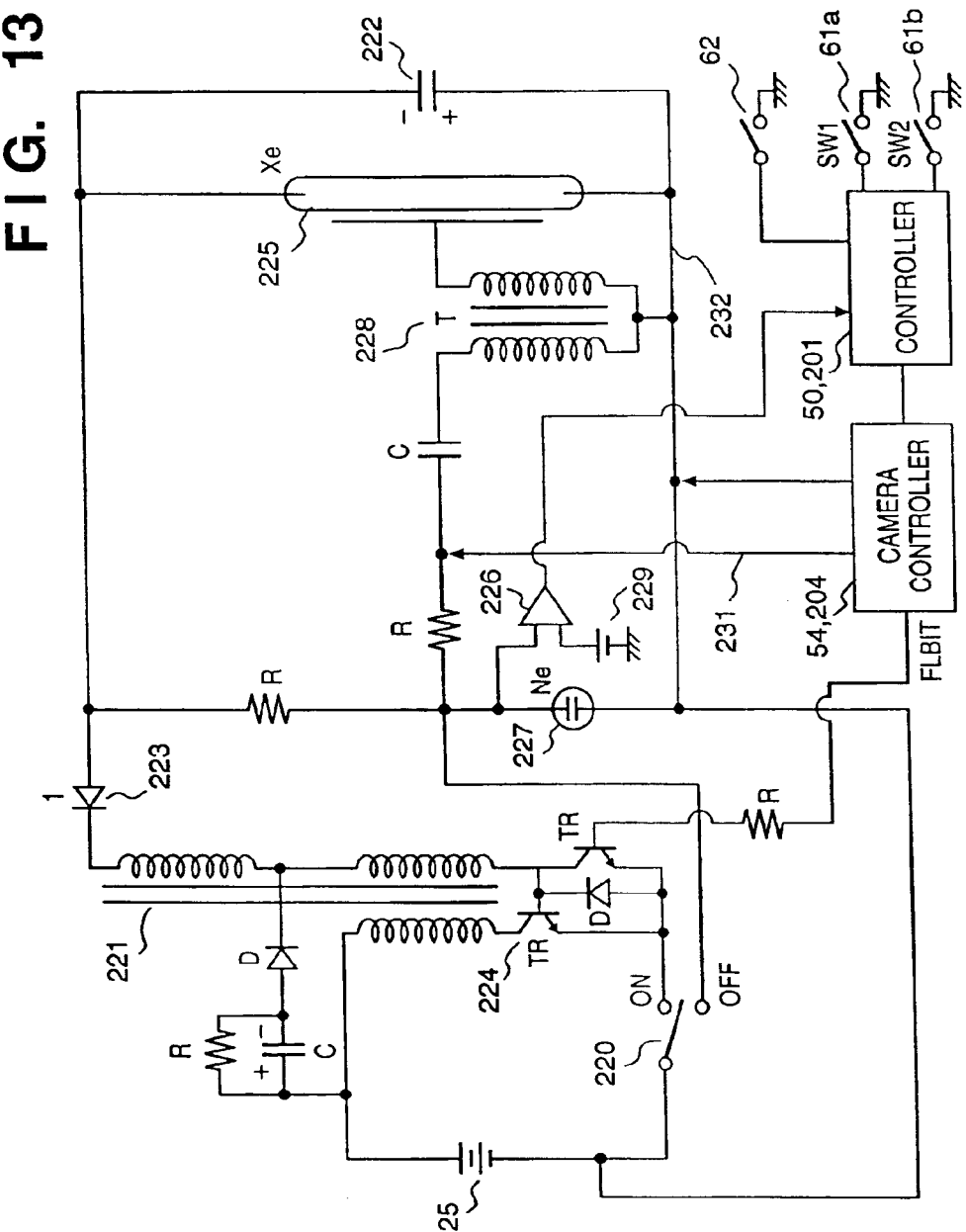
FIG. 13 is a block diagram showing a construction of a strobe circuit according to the embodiments of the present invention.

FIG. 13 is a block diagram showing a construction of a strobe circuit according to the embodiments.

In FIG. 13, TR denotes a transistor; R denotes a resistor; C denotes a capacitor; and D denotes a diode. The controller 50 or 201 turns a charging switch 220 on via the camera controller 54 or 204. Then electric power is supplied from the power battery 25 to the transistor TR224, and an oscillation transformer T221 oscillates and increases the voltage. The voltage passes through the diode D223 and charges the capacitor C222, normally with 360V. At the same time, a display 227 comprising a neon tube is turned on such that it indicates charging of the capacitor 222. When the charging of the capacitor 222 is completed, the charging switch 220 is turned off, and the display 227 is turned on such that it indicates the completion of charging of the capacitor 222. Next, when image sensing with strobe light emission is instructed, the camera controller 54 (204) outputs trigger signals 231 and 232. Then the xenon tube Xe225 is turned on via a transformer T228 and thus the xenon tube Xe225 emits light in accordance with charged amount at the capacitor 222.

In the embodiments, if the output voltage from the battery 25 is sufficiently high, it takes about four seconds from the start of charging of the capacitor 222 to a point where the capacitor 222 has a sufficient voltage (about 260 V) for light emission. Further, it takes another two seconds until the capacitor 222 is fully charged (to about 360V). If the output voltage of the battery 25 is low, close to an unchargeable level, it may take about ten seconds or longer for charging.

Accordingly, at step S33 in FIG. 11, if the user presses the print button 62 while the capacitor 222 is being charged, the controller 201 continues charging of the capacitor 222 to the voltage sufficient for light emission (about 260 V) or higher and further to an extra charged level (total of about 265 V in the embodiments) or higher. Thereafter, the controller 201 stops electric charge of the capacitor 222 and starts print operation. Note that it is detected whether or not the charged voltage at the capacitor 222 has become a reference voltage by inputting an output from a comparator 226. The comparator 226 compares the charged voltage with the voltage of a reference voltage source 229 and inputs the data into the controller 50 or 201.

This control enables the next image sensing with strobe light emission immediately after printing. Further, if a print instruction is made during charging of the capacitor 222, even if the capacitor 222 is not fully-charged charging is stopped when the capacitor 222 has a necessary and minimum charged voltage. This reduces the waiting period from the print instruction to the start of actual printing to a minimum.

[Third Embodiment]

Next, a third embodiment of the present invention will be described. in this embodiment, when printing is instructed, power supply to the electronic view finder (118) is stopped, thus preventing an increase of electric consumption at the battery 25 (123).

Figure 14:
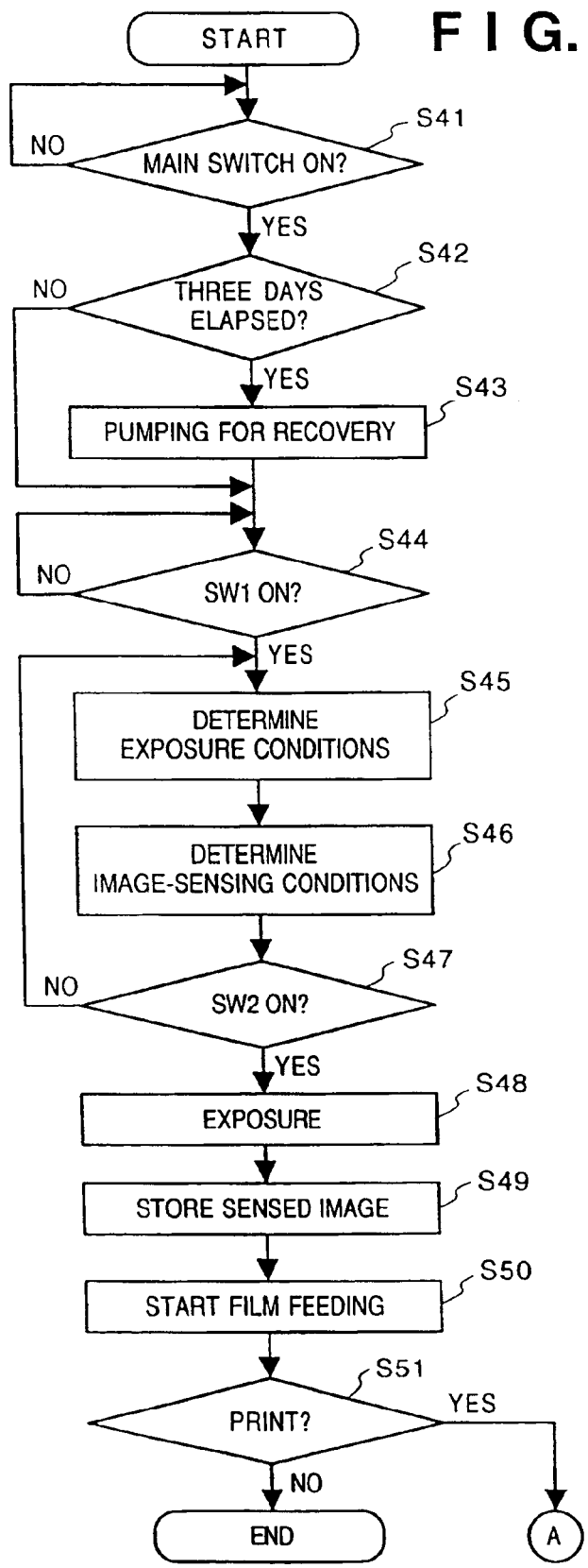
FIGS. 14 and 15 are flow-charts showing processing in the multifunction camera according to a third embodiment of the present invention.
Figure 15:
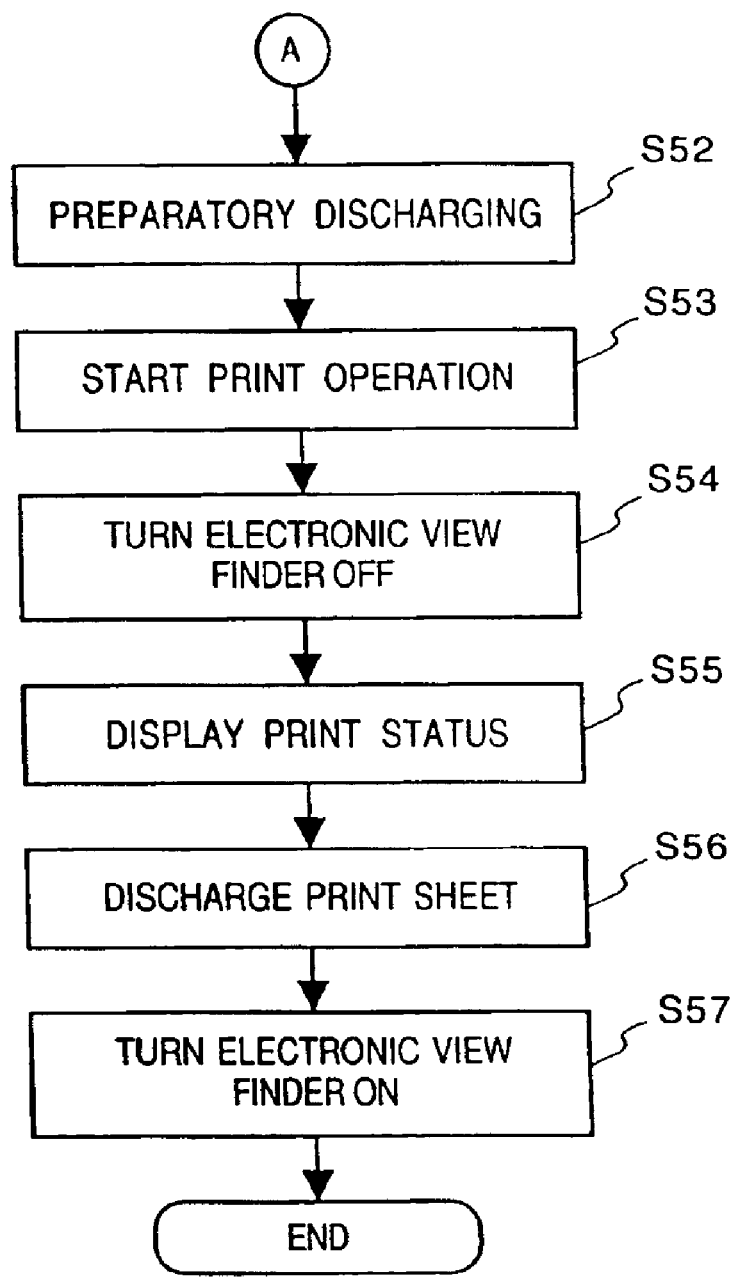

The processing at this time is shown in the flow-charts of FIGS. 14 and 15. Note that the hardware construction of the multifunction camera of the third embodiment is the same as that of the first or second embodiment except that strobe light emission (S9) is not performed. Therefore the explanation of the construction will be omitted.

At step S51, when the print button 62 is pressed, the process proceeds to step S52, at which point the carriage 4 is moved to the home position and preparatory discharging is performed (S52). At step S53, the print operation is started. The image information stored in the memory 56 is outputted to the printer engine 52, and printing is performed. Next, at step S54, the power supply to the electronic view-finder display 58 (118), which displays an image sensed by the image sensing unit 53 on a liquid crystal display panel, is stopped. Thus the power battery 25 supplies electric power mainly for print operation, which enables more stable print operation.

If information such as printing time and the like is displayed in a manner that the user can easily see, it is useful for the user to know print completion time and the like. However, in the above control, as the power supply to the electronic view-finder display 58 (118) is stopped, display on the electronic viewfinder 58 (118) is impossible. The third embodiment uses the information display unit 57 for displaying various information at the upper part of the camera main body. At step S55, only during print operation, information on the print output is displayed on the information display unit 57.

Figure 16A:
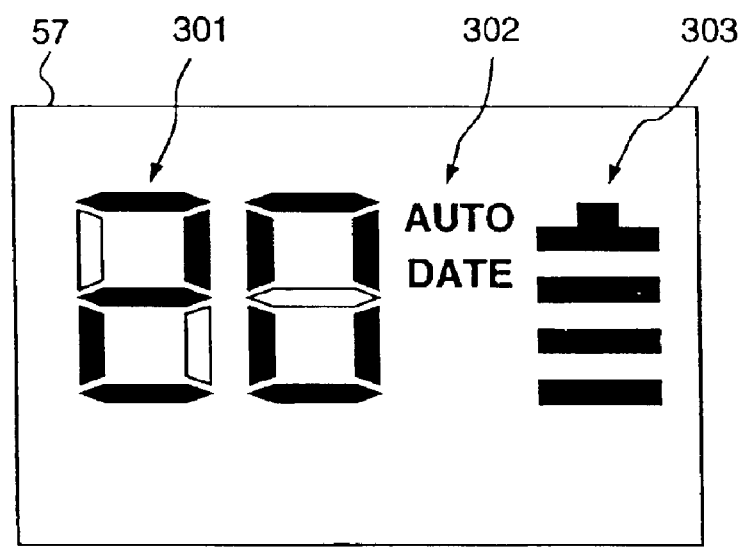
FIGS. 16A and 16B are display examples of an image display unit according to the third embodiment.
Figure 16B:
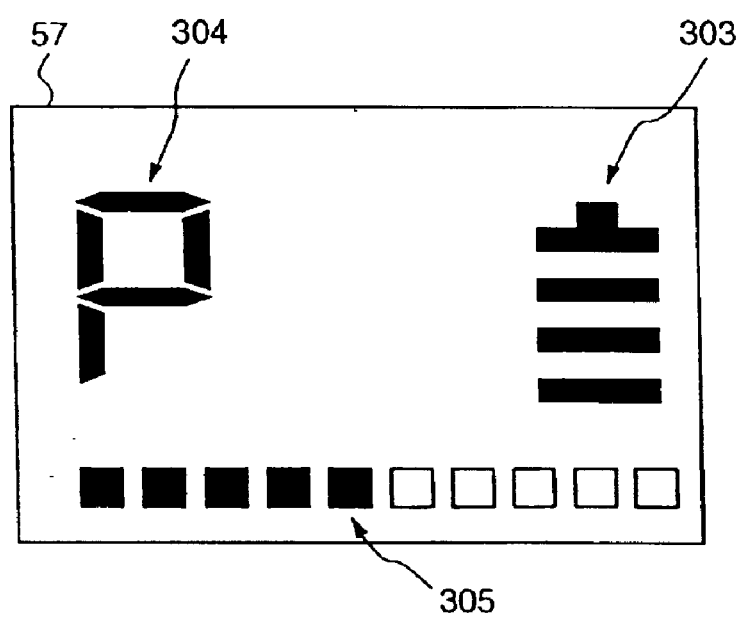

FIGS. 16A and 16B show display examples on the image display unit 57. FIG. 16A shows a display example in image sensing status; FIG. 16B shows a display example in printing status.

In FIG. 16A, numeral 301 denotes a number of sensed images; 302 denotes an image-sensing mode (automatic mode (AUTO) in FIG. 16A) and ON/OFF of overlay-printing of date over photographs (it is ON (DATE) in FIG. 16A); and 303 denotes power voltage of the battery 25.

In FIG. 16B, in print operation, numeral 304 denotes indication of printing; 303 denotes power voltage; and 305 denotes a print progress indication bar.

As predetermined printing is completed, the process proceeds to step S56, at which point the printed portion of the print sheet is discharged to be separated by the cutter 42. The print sheet is cut by the cutter 42, then at the same time as the film exposure in the still camera C, approximately the same image can be obtained as a printout. The process proceeds to step S57, at which point the power supply to the electronic view-finder display 58 (118) is resumed, and display on the information display unit 57 is set to an image-sensing state (FIG. 16A).

[Fourth Embodiment]

Figure 17:
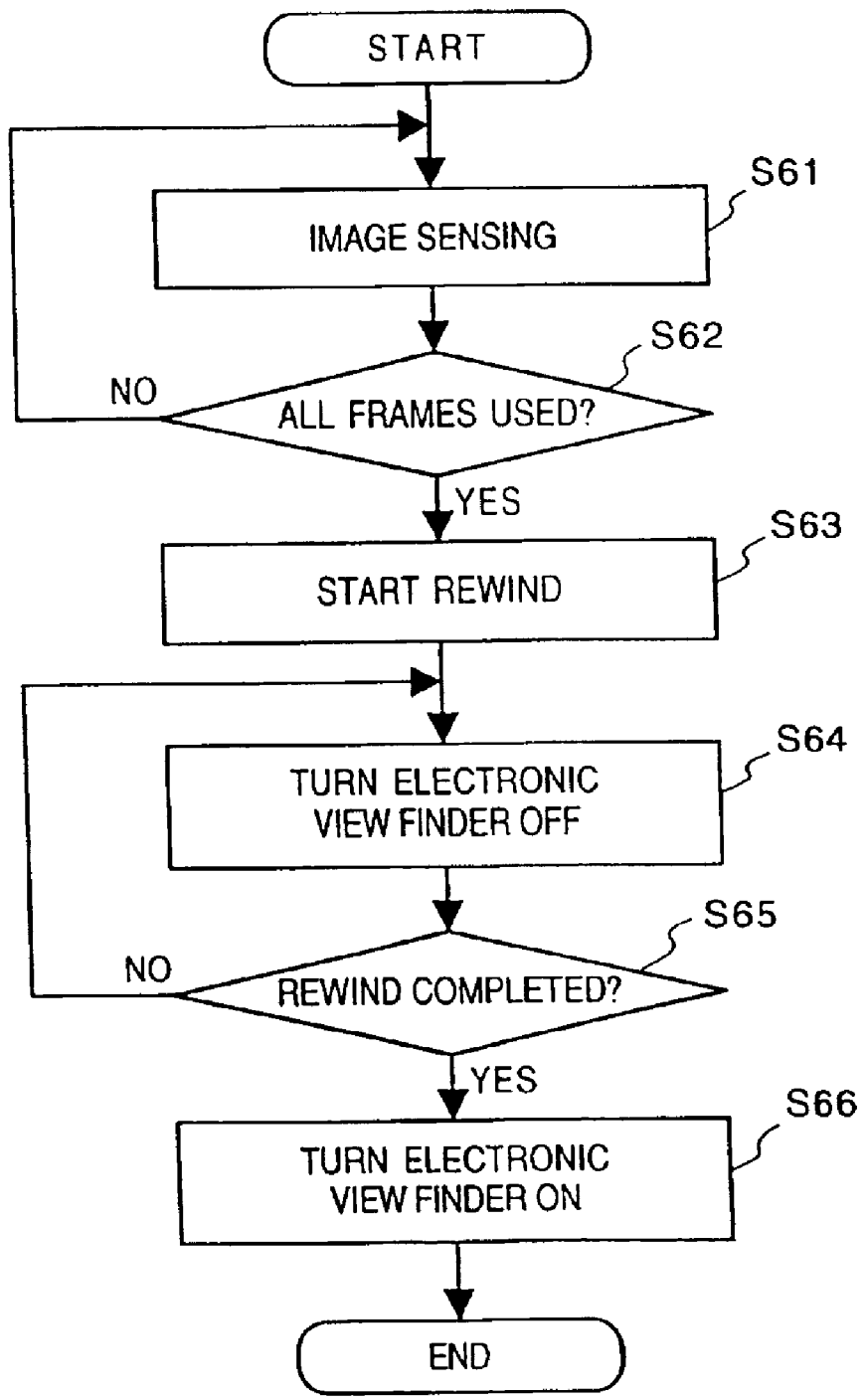
FIG. 17 is a flow-chart showing the multifunction camera according to a fourth embodiment of the present invention.

FIG. 17 is a flow-chart showing the processing necessary to stop the power supply to the electronic view-finder display 58 (118) during film rewind operation in the multifunction camera according to a fourth embodiment. Note that the hardware construction of the multifunction camera of this embodiment is the same as the above embodiments. Therefore the explanation of the structure will be omitted.

In FIG. 17, showing the operation of the multifunction camera of this embodiment, the film is wound by a necessary number of frames in advance. First, image-sensing operation is performed at step S61, and it is determined at step S62 whether or not all of the frames of the film have been used for image sensing. Note that a tensed state of the film (i.e., a state where the film has been wounded by its end and the film is tensed) can be judged based on the current or the number of rotations of a film-wind motor, and the number of available film frames can be calculated from a DX code of the film.

If all the frames have not been used in image sensing, the process returns to step S61, at which point the image sensing is performed. Thus, when all of the frames have been used, the process proceeds to step S63, at which point the film is rewound by electrifying/charging the filmwind motor of the camera unit 55 (203) in an opposite direction to that of the prewind direction via the camera controller 54 (204). At the same time, the power supply to the electronic view-finder display 58 (118) is stopped at step S64.

The power supply is held off at step S65 until the film rewind is completed. The completion of film rewind is determined by the camera controller 204 based on the turned-off status of a film-existence contact point which discriminates the existence of a film. As the film rewind is completed, the process proceeds from step S65 to step S66, at which point the power supply to the electronic view-finder display 58 (118) is resumed so that the electronic view finder can be used.

As described above, according to the fourth embodiment, the power supply to the electronic view-finder display, at which electronic consumption is large, is turned off while a sensed video image is transferred. This reduces electric consumption by the image sensing unit and ensures printing.

[Fifth Embodiment]

FIG. 18 is a block diagram showing a construction of a printer-built-in video camera according to a fifth embodiment of the present invention. This video camera print-outputs sensed images by its printer. In this construction, elements corresponding to those of the first embodiment have the same reference numerals and the explanation of the elements will be omitted.

In FIG. 18, numeral 113 denotes an image sensor; 401 denotes an A/D converter which converts a video signal outputted from the image sensor 113 into a digital signal; 402 denotes a camera process circuit which performs pre-determined processing on the digital video signal outputted from the A/D converter 401 and generates luminance signals, color signals and the like; and 403 denotes a D/A converter which converts the digital video signal, outputted from the camera process circuit 402 into an analog video signal. The analog video signal converted by the D/A converter 403 is outputted via a driver 404 to a monitor 405, such as an electronic view finder, and is displayed there.

On the other hand, numeral 406 denotes an image memory for storing the digital video signal outputted form the camera process circuit 402 for at least one frame; and 408 denotes a memory control circuit which controls writing, reading, transfer etc. of video signal with respect to the image memory 406, in accordance with instructions from a system control circuit 407. The system control circuit 407 has a CPU and the like for controlling the overall system. The system control circuit 407 controls operations of the respective portions in accordance with manipulation of various operation switches such as a release switch. The printer controller 51 controls the operation of the printer engine 52 based on an instruction from the system control circuit 407. Numeral 411 denotes a recorder-reproducer which inputs the analog video signal or the digital video signal and stores the input signal into a storage medium 409 such as a magnetic tape or a video disk, reproduces the video signal stored in the storage medium 409, and outputs the video signal as a digital signal. Note that switches SW1 to SW3 are respectively controlled by the system control circuit 407. Numeral 410 denotes various user-oriented switches connected to the system control circuit 407 such as the release switch, a recording switch, a reproduction switch and a print switch.

In the above construction, an image signal read from the image memory 406 under the control of the memory control circuit 408 is provided as print data to the printer engine 52 via the printer controller 51. On the other hand, the printer controller 51 provides control signals for control of the printhead, the print-speed feeding control, ink control of the printer and the like.

Upon still-image sensing, in response to manipulation of the release switch connected to the system control circuit 407, the switch SW3 is connected to the terminal a side, and a sensed video signal is stored into image memory 406. In this state, if the switch SW1 is turned to the terminal a side, moving-image information from the camera process circuit 402 can be displayed on the monitor 405; otherwise, if the switch SW1 is turned to the terminal b side, the still image stored in the image memory 406 is displayed on the monitor 405 so that the user can confirm the recorded image.

If the switch SW2 is turned to the terminal a side, the moving-image information from the camera process circuit 402 can be outputted as a digital signal; if the switch SW2 is turned to the terminal b side, the still image stored in the image memory 406 can be outputted as a digital signal. Further, an analog signal can always be extracted from the output of the D/A converter 403.

Upon printing a sensed still image, in accordance with an instruction from the system control circuit 407, the image data stored in the image memory 406 is read and supplied to the printer controller 51 under the control of the memory control circuit 408. The printer controller 51 controls the speed of transmitting the image data based on the image resolution, printing quality, printing speed and the like, set by instructions from the system control circuit 407. The printer controller 51 also controls operation of the printhead, the print-sheet feeding amount and feeding speed, and the ink supply (including color ink) to the printhead at the printer engine 52. Thus the printing of a still image by the printer engine 52 is performed.

Further, when the recording switch connected to the system control circuit 407 is turned on, the system control circuit 407 connects the switch SW1 or SW2 to the terminal a side in accordance with whether recorder-reproducer 411 is made in the form of analog signal or digital signal. Further, the system control circuit 407 stores the signal from the image sensor 113, by the recorder-reproducer 411, into the storage medium 409. If reproduction of the video signal from the storage medium 409 and printing of the reproduced image are instructed by the reproduction switch connected to the system control circuit 407, the system control circuit 407 connects the switch SW3 to the terminal b side, and instructs the recorder reproducer 411 to reproduce the image stored in the storage medium 409. Thus, the digital video signal reproduced by the recorder-reproducer 411 is transferred to the image memory 406 and stored there. At this time, the switch SW1 is connected to the terminal b side and the image signal read out of the image memory 406 is displayed on the monitor 405 via the D/A converter 403 and the driver 404. Upon recording/reproduction, if the user instructs printing of a desired frame by the print switch connected to the system control circuit 407, the image signal read from the image memory 406 at that time is print-outputted under the control of the printer controller 51.

Note that in the present embodiment, the user freely select an image corresponding to either an image sensed by a still camera or an image obtained at an arbitrary timing while moving-image sensing, as a video image to be printed.

In this video camera, the controls as described in the first to fourth embodiments ensure printing while suppressing electric consumption, and reduce waiting time between the current print operation to the next print operation.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on demand type or a continuous type. Particularly, in the case of the on-demand type, the system is effective because, by applying at least one driving signal, which corresponds to printing information and gives a rapid temperature rise exceeding film boiling, to each of the electrothermal transducers arranged in correspondence with a sheet or liquid channels holding a liquid (ink), heat energy is generated by the electrothermal transducer to effect film boiling on the heat acting surface of the printhead. Consequently, a bubble can be formed in the liquid (ink) in one-to-one correspondence with the driving signal. By discharging the liquid (ink) through a discharge opening by growth and shrinkage of the bubble, at least one droplet is formed.

If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention.

In addition, the present invention can be effectively applied to an arrangement based on Japanese Patent Laid-Open No. 59-123670 which discloses the arrangement using a slot common to a plurality of electrothermal transducers as a—discharge portion of the electrothermal transducers. Alternatively, the present invention can be effectively applied to an arrangement based on Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of print heads as disclosed in the above specification or the arrangement as a single printhead obtained by forming print heads integrally can be used.

In addition, an exchangeable chip type printhead which can be electrically connected to the apparatus main unit and can receive ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized.

Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as to the printing mode of the printer, aside from a printing mode using only a primary color such as black or the like, at least one of a multi-color mode using a plurality of different colors or a full-color mode achieved by color mixing can be implemented in the printer either by using an integrated printhead or by combining a plurality of print heads, The present invention is not limited to the above embodiments. Various changes and modifications can be made within the spirit and scope of the present invention. Therefore, to apprise the public of the scope of the present invention, the following claims are made.

What is claimed is:

1. An image sensing apparatus for supplying image data to a printer so as to print an image, comprising:
    a display unit configured to display an image on a screen;
    an instruction unit configured to instruct to print the image using the printer;
    a display configured to display print status information; and
    a control circuit configured to cause the printer to print the image in a case where said instruction unit instructs to print the image, and to cause said display unit not to display the image on the screen during print operation by the printer and cause said display to display the print status information while the printer is printing the image.

2. The apparatus according to claim 1, wherein said control circuit turns off display unit in order to stop displaying of the image on the screen.

3. The apparatus according to claim 1, wherein the image sensing apparatus incorporates the printer.

4. A control method for controlling an image sensing apparatus having a display unit comprising:
    a step of displaying an image on a screen of the display unit;
    an instruction step of instructing a printer to print the image; and
    a control step of controlling printing of the image by the printer and causing the display unit not to display the image on the screen during print operation instructed in said instruction step, and displaying print status information on a display while the printer is printing the image.

5. The method according to claim 4, wherein in said control step, the display unit is turned off in order to stop displaying of the image on the screen.

6. The method according to claim 4, wherein the image sensing apparatus incorporates the printer.

7. A computer readable medium for storing programs for carrying out the control method according to claim 4.

* * * * *